United States Patent [19]
Cronin

[11] 3,813,475
[45] May 28, 1974

[54] GROUNDED GAS INSULATED BUS ENCLOSURE-COMBINED ENCLOSURE JOINT BACKUP RING AND CONTAMINATION CONTROL DEVICE

[76] Inventor: John C. Cronin, 403 Georgetown, Greensburg, Pa. 15601

[22] Filed: May 21, 1973

[21] Appl. No.: 362,534

[52] U.S. Cl. .............. 174/21 C, 174/16 B, 174/28, 174/99 B
[51] Int. Cl. ............................................ H01b 9/06
[58] Field of Search ........... 174/28, 29, 16 B, 99 B, 174/88 B, 129 B, 133 B, 21 JC, 21 C; 285/286

[56] References Cited
UNITED STATES PATENTS
2,366,579  1/1945  Von Ahrens .................... 285/286 X
3,591,703  7/1971  Swenck ........................... 174/28 X Primary Examiner—A. T. Grimley
Attorney, Agent, or Firm—Ostrolenk, Faber, Gerb & Soffen

[57] ABSTRACT

Gas ($SF_6$) insulated bus systems having an outer grounded housing and an axial conductor wherein the outer housing section ends are supported in butt relation on an inner ring which also serves to position the insulator that supports the axial conductor; a butt weld may be formed between the housing ends over the ring. The butt weld and ring obviate the need for a friction fit of the housing ends within each other thereby reducing the scraping which creates impurities. The inner ring may have cylindrical extensions on each side spaced slightly from the inner wall of the housing to provide a tap which will receive and retain impurities that are created during construction or that may arise later — thereby reducing contamination of the insulating gas.

9 Claims, 5 Drawing Figures

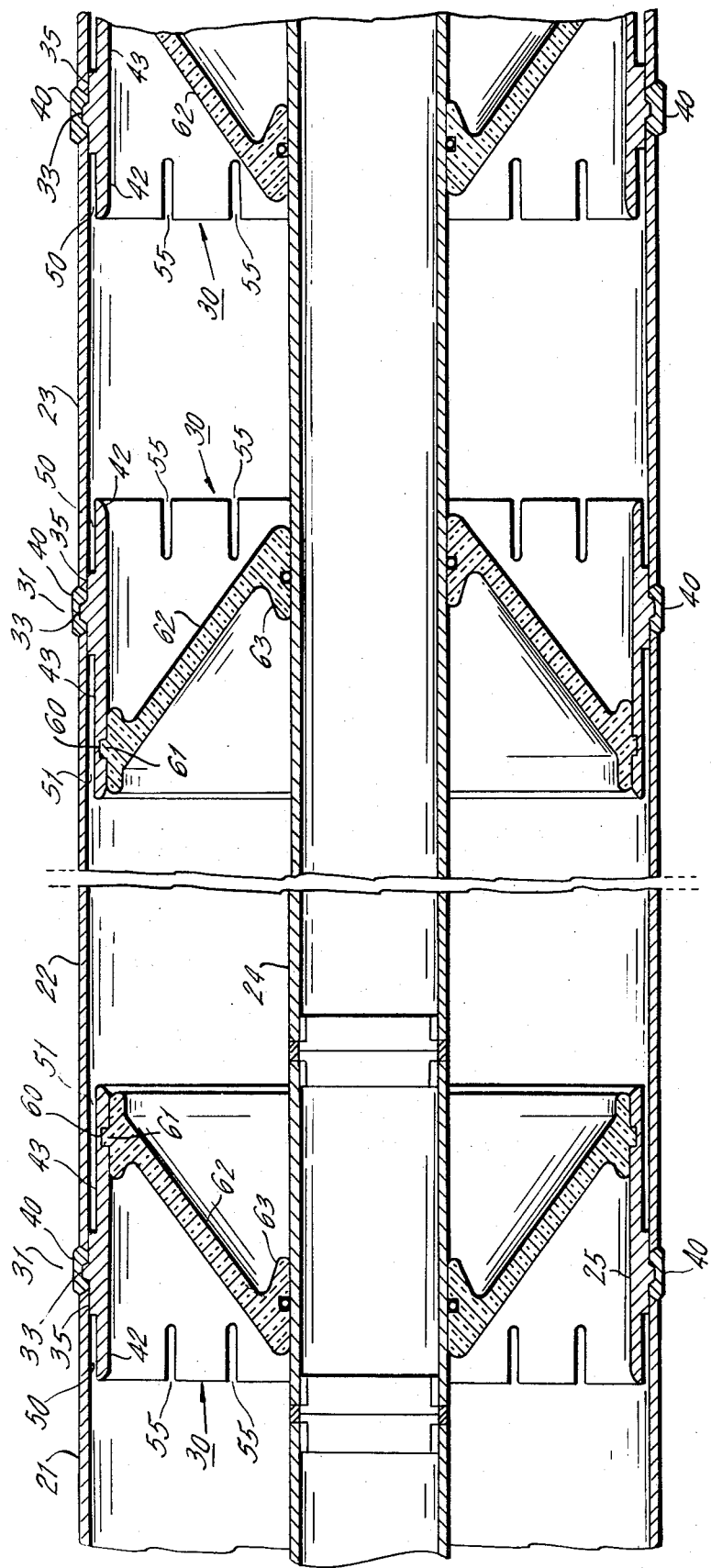

GROUNDED GAS INSULATED BUS ENCLOSURE-COMBINED ENCLOSURE JOINT BACKUP RING AND CONTAMINATION CONTROL DEVICE

BACKGROUND OF THE INVENTION

Gas insulated systems are attaining increasing acceptance in the fields of electric power transmission and electric power switching such as in substations. The gas generally used in order to provide high dielectric strength is sulfur hexafluoride ($SF_6$). While gas has many desirable properties as an insulating medium the major problem is the necessity to maintain very clean conditions and this problem requires elaborate techniques and precautions during fabrication and assembly.

Gas insulating transmission systems consist basically of two concentric cylinders, the inner cylinder or tube being the conductor and the outer cylinder or tube constituting the grounded housing or enclosure. All such systems are composed of a number of sections which it is necessary to join together.

The problems which arise in maintaining the purity of the system have been described in U.S. Pat. No. 3,688,015 assigned to the assignee of the present invention.

Various conductor systems or bus conductor systems have been described in other patents assigned to the assignee of the present invention.

U.S. Pat. No. 3,546,356 — Graybill et al.
U.S. Pat. No. 3,573,341 — Graybill et al.
U.S. Pat. No. 3,688,015 — Graybill et al.

One of the major problems which arises in maintaining the purity of the system is in connection with the joints between various sections especially in the grounding enclosure. There are presently various methods of obtaining such joints as hereinafter described in connection with FIGS. 1A and 1B. In general in one type of prior device, the various sections of the grounded enclosure are constructed so that the end of one section is expanded and the adjacent section fits inside the expansion bell; and a fillet weld is made. In another type of joint a sliding cover is used and again fillet welds are used between the sliding cover and the exterior of the two longitudinally adjacent tubes.

Because of the stresses imposed by thermal expansion and during installation it is desirable to use a butt weld instead of a fillet weld because of its greater strength. Also when sliding the sections together it is important to avoid scraping which could generate metallic particles; this is sometimes difficult because of the out-of-roundness usually associated with large diameter tubes.

SUMMARY OF THE INVENTION

The present invention proposes as its principal object a backup ring to allow a butt weld to be used with features incorporated into the design of the ring which simplify assembly provide insulator support if desired and allow conducting particles to be trapped.

The foregoing and other objects of the present invention will become apparent in the following description and drawings in which:

FIG. 4 is a longitudinal cross-sectional view showing the ring of FIG. 2 utilized in the construction and operation of the present invention.

Figure 1A:
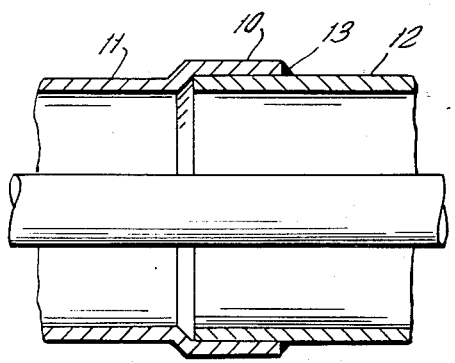
FIG. 1A is a view in longitudinal section of a prior art type of grounding enclosure connection for a gas insulated conductor.
Figure 1B:
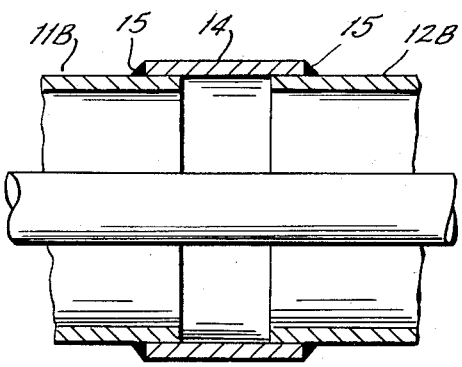
FIG. 1B is a view, also in longitudinal section, showing another type of fillet weld with an outer ring used as to form an insulating to join the ends of adjacent cylinders or tubes in a gas insulated conductor.

Referring to FIG. 1A which shows a prior type of connection for the exterior grounding tube the end 10 of tube section 11 is expanded so that it will receive tube section 12 and an annular fillet weld 13. The insertion of one tube into another may cause scraping which can generate metallic particles; this sometimes arises because of the out-of-roundness usually associated with large diameter tubes. A fillet weld as in FIG. 1B after the tubes are inserted in ring 14, can produce the same type of scraping.

The present invention solves this problem by making it possible to provide the strength of a butt weld, the positioning of the adjacent outer tubes accurately with respect to each other and also providing inherently in its construction a trap which will receive and retain most of the particles that may be abraided during assembly or during operation.

Figure 2:
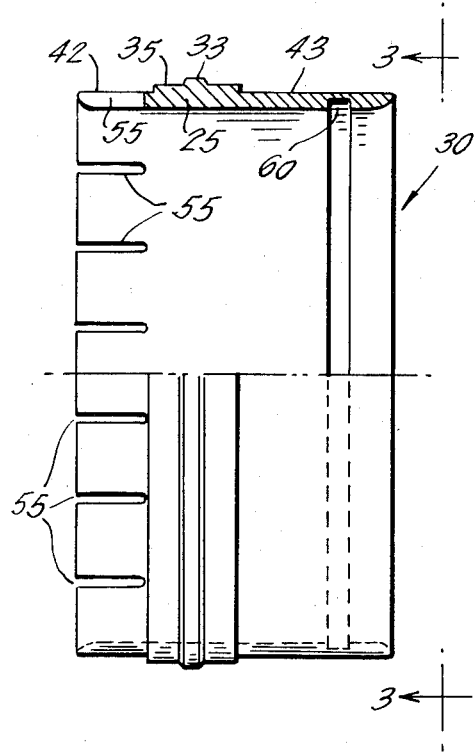
FIG. 2 is a view partly in cross-section of a ring which may be used in accordance with the present invention in order to obtain a butt weld (as hereinafter shown in FIG. 4).
Figure 3:
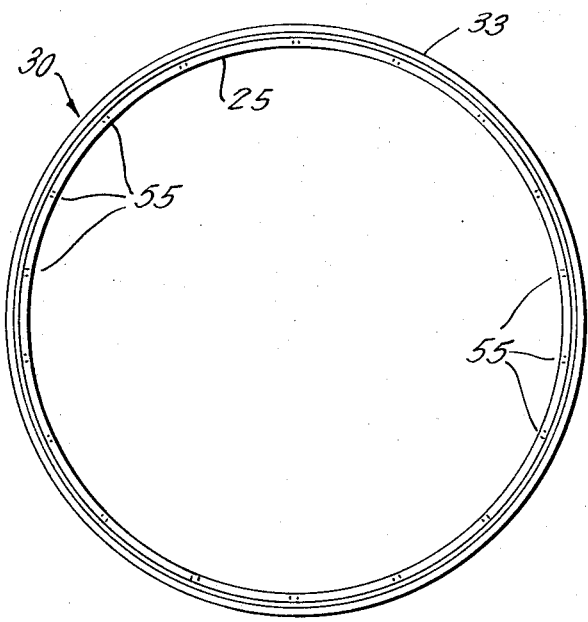
FIG. 3 is a view of the ring of FIG. 2 taken from line 3—3 of FIG. 2.

As shown in FIGS. 2, 3 and 4 the outer tube sections 21, 22, 23 et al are arranged together along a common longitudinal axis about the inner conductor 24 in such a manner that the ends thereof are in parallel planes and adjacent to each other. A backup ring 25 is provided which as hereinafter explained permits a butt weld to be used which incorporates features in the design to simplify assembly, provide an insulated support if desired and provide a trap for any loose conducting particles.

The backup ring is a relatively short cylinder 30 slightly smaller than the interior diameter of the outer grounding tubes 21, 22, 23 and is placed at the seam or joint 31 between each of the adjacent tubes 21, 22, 23 et al. The backup ring is thus placed internally of the tube. Its outer surface is provided with a positioning locator 33 which enters into and occupies the space between the adjacent ends of for instance tubes 21 and 22 and for instance tubes 22 and 23 thereby locating the tubes with respect to each other. The annular projection 33 is supported on a cylindrical or annular section 35 of the backup ring 30 which is a fairly close fit within the interior section of the tubes 21, 22 or 22, 23 so that the tubes may be slid toward each other around the section 35 and positioned accurately with respect to each other. A butt weld 40 may now be used at the joint 31 providing the greatest possible strength for the tubes 21, 22, 23 which are now located by their respective backup rings 30.

Each of the backup rings 30 is provided also with an annular extension 42 on one side of the platform 35 and an annular extension 43 on the other side of platform 35. Extensions 42 and 43 are inwardly spaced from the inner wall of tubes 21, 22, 23 and provide annular spaces 50, 51 which serve to trap loose particles.

The backup ring 30 is first spot welded at one side of its platform 35 to the end of one enclosure for instance enclosure 21 and during final assembly slides inside the adjacent enclosure section for instance enclosure section 22. By making the ends of the ring at the annular sections 42, 43 of a smaller diameter than the enclosure sections the ring fits into the enclosure without scraping and some out-of-roundness may also be tolerated. If desired the tolerance to out-of-roundness may be improved by providing a slot or slots in the ring as indicated generally at the slot of 55 of FIG. 4 so that it can be compressed.

The increase of diameter of the backup ring 30 at the region 35 is provided so that a close fit to the enclosure is obtained and this aids in keeping the weld contamination from entering the system. If desired this portion of the ring may be coated with teflon to avoid scraping or the slot 55 can be extended into this region as shown in FIG. 4 to provide a snap fit to the inside of the enclosure. The joint between tubes 21, 22 and 22-23 over the extension 33 can then be covered with a piece of aluminum or other similar material to prevent the weld from penetrating inside the system.

The gaps 50 and 51 between the edge of the ring and the enclosure allows conducting particles moving under the influence of an electric field to drift under the ring. These particles are unable to acquire enough energy to drift back into the high stress region and reliability is therefore improved.

In actual tests with a backup ring of the type described, over 95 percent of the particles in the system (one gram of fine aluminum particles which pass through a No. 40 mesh screen) were trapped under the ring after a few minutes application of voltage. This operation therefore clears the interior of the conductive tube 21, 22, 23 of particles which would interfere with the dielectric constant desired for the particular installation. The fact that the backup ring decreases the distance between the conductor 24 and the grounding tube 21, 22, 23 is not significant. The stress at the enclosure is typically 2 to 3 times lower than the stress at the conductor so some stress increase can be tolerated at the ring without causing a problem. However sharp corners must of course to avoided.

The stress at the conductor is also increased but only slightly. This is seen by considering the equation for stress at the conductor.

$$E = \text{Voltage}/r_c \ln r_E/(r_c)$$

where
$r_c =$ Conductor Radius
$r_E =$ Enclosure Radius (inner surface)

For a system with $r_c = 3$ inches and $r_E = 8.75$ inches (the present 345 kV system), the enclosure radius can be decreased by 0.5 inch with only a 5 percent increase in stress at the conductor. Tests on a system with a 4.5 inch OD conductor and a 10.5 inch ID enclosure, using a 9.9 inch ID backup ring, have demonstrated no measurable difference in dielectric performance.

The ring 30 may be rolled from an extrusion and allowed to snap into place against the enclosure if desired. As shown also in FIG. 4 the ring 30 may be provided at the underside of one of the extensions of for instance extension 43 with a recess 60 which will receive an extension 61 of an annular insulating support member 62 which insulator is provided with an annular foot 63 in order to support the inner conductor 24. In this case the utilization of the slots 55 may be valuable in permitting the ring 30 to accommodate itself to the relatively rigid insulator 62 in those circumstances (as for instance in an underwater system) where forces on the enclosure may damage the insulators. The utilization of such slots would permit the ring 30 to give as needed under these forces so that the forces will not be transmitted directly or in too great force to the insulators 62.

In the foregoing this invention has been described in connection only with illustrative embodiments thereof. Since many variations and modifications of this invention will now be obvious to those skilled in the art it is preferred that the scope of this disclosure be limited not by the specific illustrative embodiments herein set forth but only by the appended claims.

The embodiments of the invention in which an exclusive privilege or property is claimed are defined as follows:

1. In a gas insulated bus having a grounded housing comprising a plurality of tubular sections connected end to end; and an axially mounted conductor;
   a connector for each adjacent tubular housing section;
   said connector comprising a cylindrical annular member,
   said annular member having a central circumferential projection having an outer diameter greater than that of the inner diameter of each adjacent tubular housing section;
   an annular extension on each side of said projection of said annular member; said annular extensions having a diameter substantially matching the inner diameter of said tubular housing sections;
   said annular extensions supporting and positioning said tubular housing sections;
   the end of each tubular housing section at said annular member extending up to and adjacent said projection of said annular member;
   an additional annular extension from at least one of said first mentioned annular extensions;
   said additional annular extension having an outer diameter less than that of the interior diameter of the tubular housing section and forming, with the adjacent tubular housing section, an annular pocket.

2. The gas insulated bus of claim 1 wherein the outer diameter of said projection of said annular member is less than the outer diameter of each adjacent tubular housing section;
   and a butt weld between the edges of said adjacent housing section over said projection.

3. The gas insulated bus of claim 2 wherein a sealing element extends between the adjacent tubular housing sections over said projection.

4. The gas insulated bus of claim 1, having a second additional annular extension from the other of said first mentioned annular extensions;
   said second additional annular extension having an outer diameter less than that of the interior diameter of the tubular housing section and forming, with the adjacent tubular housing section, an annular pocket on the other side of said annular member.

5. The gas insulated bus of claim 4, wherein the said pockets form a trap for impurities within the said housing.

6. The gas insulated bus of claim 1, wherein is provided an insulating member having a central opening; said axial conductor being supported in said central opening, a support for said insulating member; said support comprising means on the inner surface of said additional annular extension engageable with the edge of said insulating member.

7. The gas insulated bus of claim 1, wherein is provided a circular insulating member having a central opening; said axial conductor being supported in said central opening, a support for said circular insulating member; said support comprising means on the inner surface of said additional annular extension engageable with the edge of said circular insulating member.

8. The gas insulated bus of claim 1 wherein said additional extension has a plurality of slots therein each extending from the outer end thereof and lying substantially parallel to the axis of said housing.

9. The gas insulated bus of claim 8 wherein certain of said slots also extend into the first mentioned annular extension of said annular member to which said additional extension is connected.

* * * * *

UNITED STATES PATENT OFFICE
CERTIFICATE OF CORRECTION

Patent No. 3,813,475                Dated May 28, 1974

Inventor(s)     John C. Cronin

It is certified that error appears in the above-identified patent and that said Letters Patent are hereby corrected as shown below:

On the cover sheet insert -- [73] Assignee: I-T-E Imperial Corporation, Spring House, Pa. --.

Signed and sealed this 19th day of November 1974.

(SEAL)
Attest:

McCOY M. GIBSON JR.            C. MARSHALL DANN
Attesting Officer              Commissioner of Patents